(12) United States Patent
Fukuda

(10) Patent No.: US 6,810,115 B2
(45) Date of Patent: Oct. 26, 2004

(54) CALLER IDENTIFICATION METHOD FOR A TELEPHONE SYSTEM AND TELEPHONE SYSTEM WITH A CALLER IDENTIFYING FUNCTION USING THE METHOD

(75) Inventor: Michiko Fukuda, Tokyo (JP)

(73) Assignee: NEC Corporation, Tokyo (JP)

(*) Notice: Subject to any disclaimer, the term of this patent is extended or adjusted under 35 U.S.C. 154(b) by 105 days.

(21) Appl. No.: 10/188,238

(22) Filed: Jul. 3, 2002

(65) Prior Publication Data

US 2003/0016800 A1 Jan. 23, 2003

(30) Foreign Application Priority Data

Jul. 5, 2001 (JP) ........................................ 2001-204360

(51) Int. Cl.[7] .......................... H04M 1/56; H04M 15/06
(52) U.S. Cl. ............................. 379/142.01; 379/142.04; 379/142.07; 379/142.14; 379/142.15; 379/142.16; 379/93.23; 379/88.19
(58) Field of Search ........................ 379/142.01, 142.04, 379/142.05, 142.06, 142.07, 142.13, 142.14, 142.15, 142.16, 142.17, 88.11, 88.13, 88.19, 88.21, 93.23; 455/414, 415

(56) References Cited

U.S. PATENT DOCUMENTS

| | | | | |
|---|---|---|---|---|
| 5,740,163 A | * | 4/1998 | Herve ........................ | 370/271 |
| 5,761,279 A | * | 6/1998 | Bierman et al. ......... | 379/93.23 |
| 5,907,604 A | * | 5/1999 | Hsu ....................... | 379/142.06 |
| 5,999,599 A | * | 12/1999 | Shaffer et al. ........... | 379/93.23 |
| 6,385,306 B1 | * | 5/2002 | Baxter, Jr. .............. | 379/88.13 |

FOREIGN PATENT DOCUMENTS

| | | |
|---|---|---|
| EP | 0 802 661 A2 | 10/1997 |
| EP | 0 973 309 A2 | 1/2000 |
| EP | 1 069 789 A1 | 1/2001 |
| GB | 2 384 390 | 5/2002 |
| JP | 3-162087 | 7/1991 |
| JP | 10-042113 A | 2/1998 |
| JP | 10-190843 | 7/1998 |
| JP | 11-32105 | 2/1999 |
| JP | 11-32115 | 2/1999 |
| JP | 11-032115 A | 2/1999 |
| JP | 2000-270087 A | 9/2000 |
| JP | 2001-78271 | 3/2001 |
| WO | WO 99/44374 A1 | 9/1999 |
| WO | WO 02/35814 A2 | 5/2002 |

* cited by examiner

Primary Examiner—Quoc Tran
(74) Attorney, Agent, or Firm—Foley Lardner LLP

(57) ABSTRACT

In a transmitting-side telephone apparatus 1 of a telephone system, a multimedia data multiplexing portion 108 multiplexes character data in a character data memory 101, image data in an image data memory 104, and music data in a music data memory 107 to produce multiplexed multimedia data to be memorized in a caller identification information holding memory 109 as caller identification information. A communication control information/caller identification information multiplexing portion 110 multiplexes communication control information from a transmission communication control portion 111 and the caller identification information from the caller identification information holding memory 109 to produce multiplexed transmission data to be transmitted through a transmitting portion 112. A receiving-side telephone apparatus of the telephone system demultiplexes the multiplexed transmission data and demultiplexes the caller identification information comprising the multiplexed multimedia data to produce unique expression based on the character data, the image data, and the music data.

11 Claims, 3 Drawing Sheets

CALLER IDENTIFICATION METHOD FOR A TELEPHONE SYSTEM AND TELEPHONE SYSTEM WITH A CALLER IDENTIFYING FUNCTION USING THE METHOD

BACKGROUND OF THE INVENTION

This invention relates to a caller identification method which is for use in a telephone system including a plurality of telephone apparatuses connected to a telephone network and communicable with one another and which enables a receiving-side telephone apparatus to identify a transmitting-side telephone apparatus as a caller upon reception of a call. This invention also relates to a telephone system with a caller identification function using the above-mentioned method.

In recent years, various types of telephone systems are increasingly wide spread because they are conveniently used. In particular, use of a mobile telephone system is growing into market saturation. In the market of a telephone apparatus, it is predicted that, in response to users' demands, each telephone system will be improved further by differentiation from other telephone systems, exhibition of uniqueness, or establishment of a function as a communication tool which is easefully and securely used.

As one of techniques already commercialized, there is known a telephone system with a caller identification function (hereinafter abbreviated to caller identification function) in which a receiving-side telephone apparatus produces and plays a ring tone melody upon call reception if a transmitting-side telephone apparatus as a caller is identified. Such caller identification function is implemented as follows. The receiving-side telephone apparatus has a nonvolatile memory in which a plurality of ring tone melodies are preliminarily stored in correspondence to telephone numbers, abbreviation numbers thereof, or the like as unique or distinctive information of users of transmitting-side telephone apparatuses as expected callers. Upon reception of a call from a particular caller, one of the melodies is sounded and played in correspondence to a particular one of the telephone numbers or the abbreviation numbers which is assigned to the particular caller. From the uniqueness of the melody, a user of the receiving-side telephone apparatus can identify the particular caller as a user of the transmitting-side telephone apparatus.

Furthermore, as a recent tendency or trend in the telephone system in response to the users' demands, the data capacity to be transmitted and received will considerably be increased. Following such trend, it is expected that image data are handled by both of the transmitting-side and the receiving-side telephone apparatuses. Specifically, the telephone apparatus will be provided with a miniaturized camera and an image codec to be used as a digital camera or a video camera, as a so-called television telephone for exchanging image data in real time with another telephone apparatus having the similar function, and so on. Japanese Unexamined Patent Publication No. H03-162087 (JP 3-162087 A) discloses a digital television telephone system in which image data taken into a receiving-side telephone apparatus by the use of the above-mentioned means are related to telephone numbers or abbreviation numbers thereof assigned to transmission-side telephone apparatuses as expected callers. Upon reception of a call from a particular caller, a particular one of the image data is selected to display an image in correspondence to a particular one of the telephone numbers or the abbreviation numbers which is assigned to the particular caller. Thus, a user of the receiving-side telephone apparatus can identify the particular caller as a user of the transmitting-side telephone apparatus.

As another known technique related to the telephone system with a caller identification function, Japanese Unexamined Patent Publication No. H10-190843 (JP 10-190843 A) discloses a caller display system and an exchange therefor. In this system, the exchange or a telephone line control center is provided with a subscriber database. The subscriber database additionally contains various kinds of data indicative of permission or refusal to display caller information, presence or absence of an information display request key, the types of displayable characters, and so on with respect to each individual subscriber (telephone number) so that the updating operation of the subscriber database is simplified and the caller information can be displayed in various manners. Japanese Unexamined Patent Publication No. H11-32105 (JP 11-32105 A) discloses a mobile data terminal and a call announcing method therefor. The technique disclosed in this publication aims to provide high-value added call announcement in order to solve the problem that call announcement in the mobile data terminal is common or indistinctive and, therefore, can not easily be discriminated from call announcement in other mobile data terminals. Japanese Unexamined Patent Publication No. 2001-78271 (JP 2001-78271 A) discloses a caller information providing device and a caller information transmitting method in a mobile communication network. In the technique disclosed in this publication, a caller can transmit image information of the caller when a telephone call is transmitted from the caller through the mobile communication network to a mobile terminal as a specific receiver.

Referring to FIG. 1, description will be made of a related telephone system with a call identifying function.

As illustrated in FIG. 1, a receiving-side telephone apparatus 3 with a caller identification function receives a call from a transmitting-side telephone apparatus (not shown) through a telephone network 10 including an ISDN network 10a, a mobile telephone network 10b, and a PHS network 10c. The receiving-side telephone apparatus 3 comprises a receiving portion 31 for receiving communication information including a telephone number (i.e., a caller number) of a user of the transmitting-side telephone apparatus upon call reception, a caller number detecting portion 32 supplied with the communication information received by the receiving portion 31 for detecting, as a detected caller number, the telephone number assigned to the user of the transmitting-side telephone apparatus, a telephone directory 33 which includes a text memory 33a, an image memory 33b, and a ring tone memory 33c preliminarily storing various kinds of caller-identifiable unique information corresponding to each of a plurality of caller numbers and which reads the unique information from those memories in correspondence to the detected caller number and outputs the unique information, a character output portion 34 supplied with character data from the text memory 33a as one of the unique information delivered from the telephone directory 33 for producing a character expression or output, an image decoder portion 35 for decoding image data from the image memory 33b to produce decoded image data, an image output portion 36 supplied with the decoded image data for producing an image expression or output, a music decoder portion 37 for decoding music data from the ring tone memory 33c to produce decoded music data, and a music output portion 38 supplied with the decoded music data for producing a sound expression or output.

In case where the above-mentioned receiving-side telephone apparatus 3 with a caller identification function receives a call from the transmitting-side telephone apparatus, the following operations will be carried out. The character data indicative of text information such as a caller's name are read from the text memory 33a so that a text comprising a set of characters is displayed by the character output portion 34. The image data are read from the image memory 33b and decoded by the image decoder portion 35 so that an image is displayed by the image output portion 36. The music data are read from the ring tone memory 33c and decoded by the music decoder portion 37 so that a ring tone melody is played by the music output portion 38.

Thus, upon call reception from the transmitting-side telephone apparatus, the receiving-side telephone apparatus 3 with a caller identification function displays the characters and the image based on the character data and the image data related to the caller number or generates the ring tone melody based on the music data similarly related to the caller number. In this manner, a user of the receiving-side telephone apparatus 3 responds to the call and starts communication after visually or audibly recognizing the caller.

However, the above-mentioned telephone system with a caller identification function (the receiving-side telephone apparatus with a caller identification function) is disadvantageous in the following respects. In order to obtain the caller identification function, the user of the receiving-side telephone apparatus must preliminarily carry out a telephone directory registering operation of obtaining various kinds of unique information indicative of caller identification information, such as a telephone number, a user's name, a ring tone melody based on music data, and image data for each of a plurality of users of transmitting-side telephone apparatuses as expected callers, and registering these information in relation to one another. Such telephone directory registering operation is troublesome and time-consuming. For example, it is very troublesome for the user of the receiving-side telephone apparatus to manually input the user's name in correspondence to each of the telephone numbers of the expected callers and to register the ring tone melody and the image data in relation thereto. Furthermore, in case where an unknown caller is calling for the first time, such caller can not be identified. In addition, the number of the ring tone melodies or the image data which can be registered or designated is limited because the memory capacity of the memories is physically restricted. Such limitation is remarkable in case of a mobile telephone because it is difficult to contain a large-capacity memory. Thus, it is impossible to register the caller identification information in correspondence to a large number of the telephone numbers desired by the user.

By the use of the technique disclosed in Japanese Unexamined Patent Publication No. H10-190843, it is possible to reduce the time and the labor required for the user of the receiving-side telephone apparatus to preliminarily register various kinds of unique information indicative of the caller identification information for each of the users of the transmitting-side telephone apparatuses as the expected callers in relation to one another. Thus, irrespective of the memory capacity of the memories mounted to the receiving-side telephone apparatus, a large number of callers can be identified. In this case, however, it is necessary to make the subscriber database on the side of the telephone network hold and memorize the caller identification information. Therefore, the degree of freedom in functional selection is decreased. For example, it is difficult that the user himself operates the telephone apparatus to set and register a desired combination of various kinds of unique information for each caller and to change the setting. Thus, the optionality and the convenience are degraded.

SUMMARY OF THE INVENTION

It is therefore an object of this invention to provide a caller identification method for a telephone system, which is capable of easily, efficiently, and properly identifying a caller and producing a caller identifiable expression irrespective of physical limitation of a memory capacity, without requiring a preliminary telephone directory registering operation of registering various kinds of caller identification information in relation to one another and without degrading the optionality and the convenience.

It is another object of this invention to provide a telephone system with a caller identification function using the above-mentioned method.

According to an aspect of this invention, there is provided a caller identification method for use in a telephone system in which communication is possible between a transmitting-side telephone apparatus and a receiving-side telephone apparatus through a telephone network after a call origination operation and a call receiving operation are carried out in the transmitting-side telephone apparatus and the receiving-side telephone apparatus, respectively, the method enabling the receiving-side telephone apparatus to identify the transmitting-side telephone apparatus as a caller, the transmitting-side telephone apparatus having a memory which stores unique information as caller identification information, the transmitting-side telephone apparatus transmitting, upon origination of a call, the caller identification information following communication control information for connection of communication through the telephone network to the receiving-side telephone apparatus, the receiving-side telephone apparatus receiving the caller identification information upon reception of the call and identifying the caller on the basis of the caller identification information, wherein:

the transmitting-side telephone apparatus multiplexes a plurality of different kinds of unique information including at least character data, image data, and music data to produce multiplexed multimedia data;

the transmitting-side telephone apparatus storing the multiplexed multimedia data in the memory as the caller identification information;

the transmitting-side telephone apparatus transmitting, upon origination of the call, the multiplexed multimedia data as the caller identification information following the communication control information from the memory to the receiving-side telephone apparatus through the telephone network;

the receiving-side telephone apparatus receiving the multiplexed multimedia data as the caller identification information upon reception of the call;

the receiving-side telephone apparatus demultiplexing the multiplexed multimedia data into the character data, the image data, and the music data;

the receiving-side telephone apparatus identifying the caller on the basis of the character data, the image data, and the music data.

According to another aspect of this invention, there is provided a telephone system in which communication is possible between a transmitting-side telephone apparatus and a receiving-side telephone apparatus through a telephone network after a call origination operation and a call receiving operation are carried out in the transmitting-side telephone apparatus and the receiving-side telephone apparatus, respectively, the system enabling the receiving-side telephone apparatus to identify the transmitting-side telephone apparatus as a caller, the transmitting-side telephone apparatus including a memory which stores unique information as caller identification information, the transmitting-side telephone apparatus transmitting, upon origination of a call, the caller identification information following communication control information for connection of communication through the telephone network to the receiving-side telephone apparatus, the receiving-side telephone apparatus receiving the caller identification information upon reception of the call and identifying the caller on the basis of the caller identification information, wherein the transmitting-side telephone apparatus comprises:

a multiplexing portion for multiplexing a plurality of different kinds of unique information including at least character data, image data, and music data to produce multiplexed multimedia data, the multiplexing portion storing the multiplexed multimedia data in the memory as the caller identification information; and a transmitting portion for transmitting, upon origination of the call, the multiplexed multimedia data as the caller identification information following the communication control information from the memory to the receiving-side telephone apparatus through the telephone network;

the receiving-side telephone apparatus comprising:

a receiving portion for receiving the multiplexed multimedia data as the caller identification information upon reception of the call; and a demultiplexing portion for demultiplexing the multiplexed multimedia data into the character data, the image data, and the music data;

the receiving-side telephone apparatus identifying the caller on the basis of the character data, the image data, and the music data.

According to still another aspect of this invention, there is provided a transmitting-side telephone apparatus comprising:

a memory which stores unique information as caller identification information;

a multiplexing portion for multiplexing a plurality of different kinds of unique information including at least character data, image data, and music data to produce multiplexed multimedia data, the multiplexing portion storing the multiplexed multimedia data in the memory as the caller identification information; and a transmitting portion for transmitting, upon origination of a call, the multiplexed multimedia data as the caller identification information from the memory to a receiving-side telephone apparatus through a telephone network.

According to yet another aspect of this invention, there is provided a receiving-side telephone apparatus for use in combination with a transmitting-side telephone apparatus comprising: a memory which stores unique information as caller identification information; a multiplexing portion for multiplexing a plurality of different kinds of unique information including at least character data, image data, and music data to produce multiplexed multimedia data, the multiplexing portion storing the multiplexed multimedia data in the memory as the caller identification information; and a transmitting portion for transmitting, upon origination of a call, the multiplexed multimedia data as the caller identification information from the memory to the receiving-side telephone apparatus through a telephone network; the receiving-side telephone apparatus comprising:

a receiving portion for receiving the multiplexed multimedia data as the caller identification information upon reception of the call; and a demultiplexing portion for demultiplexing the multiplexed multimedia data into the character data, the image data, and the music data;

the receiving-side telephone apparatus identifying the caller on the basis of the character data, the image data, and the music data.

Japanese Unexamined Patent Publication No. H11-32115 (JP 11-32115 A) discloses that a caller terminal sends, to a receiver terminal, caller information of image data of a still image or a time-varying image and voice data which are previously stored. However, the above-mentioned Japanese Unexamined Patent Publication No. H11-32115 (JP 11-32115 A) never discloses that the transmitting-side telephone apparatus has a multiplexing portion for multiplexing a plurality of different kinds of unique information including at least character data, image data, and music data to produce multiplexed multimedia data, the multiplexing portion storing the multiplexed multimedia data in the memory as the caller identification information and that the transmitting-side telephone apparatus transmits, upon origination of the call, the multiplexed multimedia data from the memory to the receiving-side telephone apparatus. Furthermore, the above-mentioned Japanese Unexamined Patent Publication No. H11-32115 (JP 11-32115 A) also never discloses that the receiving-side telephone apparatus has a demultiplexing portion for demultiplexing the multiplexed multimedia data into the character data, the image data, and the music data.

Figure 1:
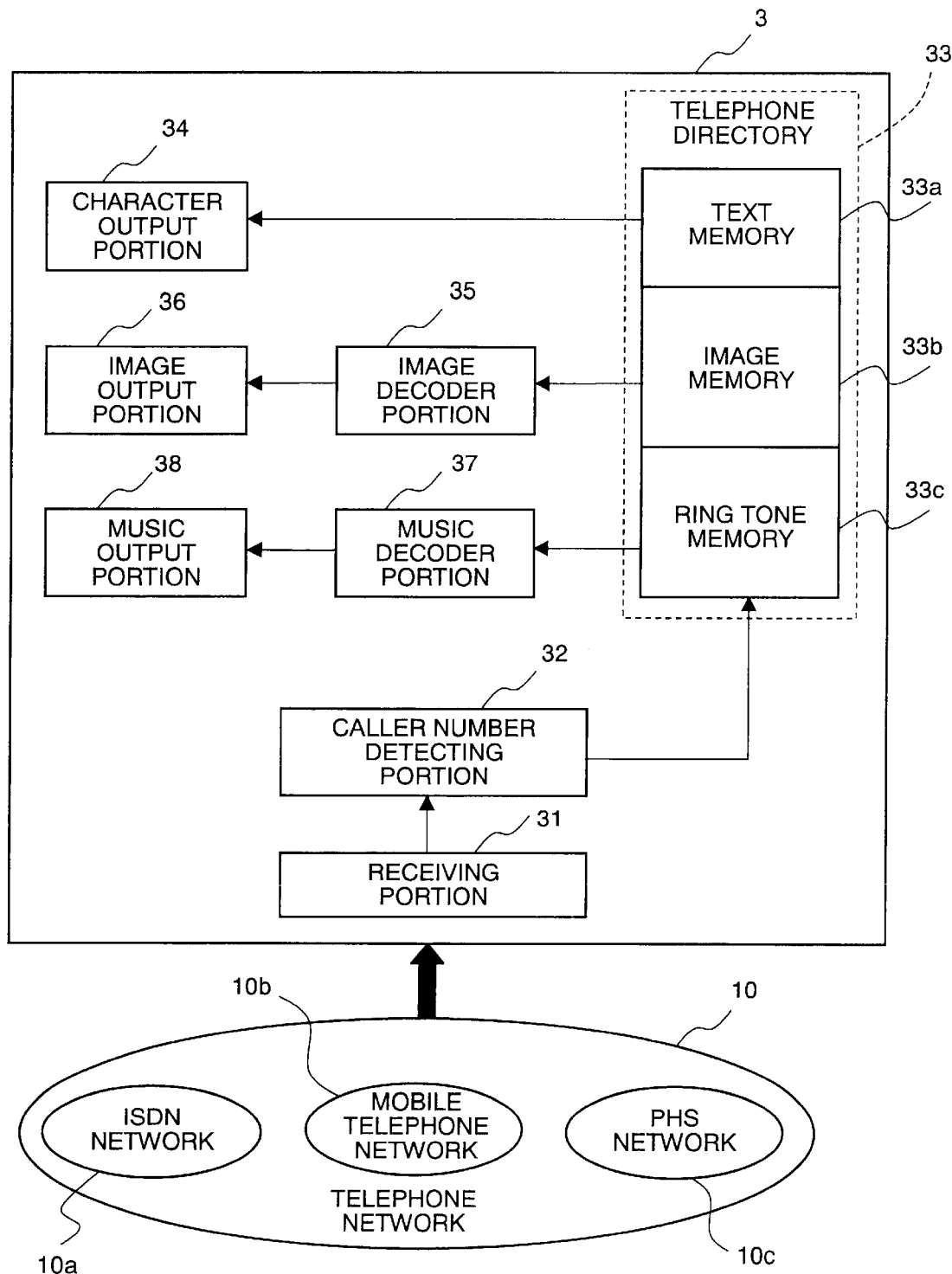
FIG. 1 is a block diagram showing a receiving-side telephone apparatus with a caller identification function used in a related telephone system with a caller identification function.

DESCRIPTION OF THE PREFERRED EMBODIMENT:

Now, description will be made of an embodiment of this invention with reference to the drawing.

At first, a technical concept of a caller identification method for a telephone system according to this invention will briefly be described. The caller identification method is for use in a telephone system in which communication is possible between a transmitting-side telephone apparatus and a receiving-side telephone apparatus through a telephone network after a call receiving operation is carried out. The caller identification method enables the receiving-side telephone apparatus to identify the transmitting-side telephone apparatus as a caller. Specifically, the transmitting-side telephone apparatus has unique information as caller identification information set and held therein and, upon origination of a call, sends the caller identification information following communication control information for connection of communication through the telephone network to the receiving-side telephone apparatus. The receiving-side telephone apparatus receives the caller identification information upon reception of the call and identifies the caller or the transmitting-side telephone apparatus with reference to the caller identification information to produce unique expression representative of the caller.

It is to be noted here that the transmitting-side telephone apparatus transmits, as the caller identification information, multiplexed multimedia data obtained by combining and multiplexing a plurality of different kinds of unique information including at least character data, image data, and music data preliminarily entered and registered. The receiving-side telephone apparatus receives the multiplexed multimedia data as the caller identification information and demultiplexes the multiplexed multimedia data into the character data, the image data, and the music data.

By the use of the caller identification method mentioned above, a user of the transmitting-side telephone apparatus in the telephone system preliminarily enters, sets, and registers the character data, the image data, and the music data. These data are multiplexed into the multiplexed multimedia data as the caller identification information. Herein, a desired combination of these data can be selected. Upon call origination, the caller identification information comprising the multiplexed multimedia data is automatically sent from the transmitting-side telephone apparatus to the receiving-side telephone apparatus. Upon call reception, the receiving-side telephone apparatus receives the caller identification information comprising the multiplexed multimedia-data and automatically demultiplexes the multiplexed multimedia data into the character data, the image data, and the music data. Thus, it is unnecessary for a user of the receiving-side telephone apparatus to preliminarily carry out troublesome operations of obtaining various kinds of unique information indicative of the caller identification information, such as a telephone number, a user's name, a ring tone melody based on music data, and image data for each of a plurality of users of transmitting-side telephone apparatuses as expected callers, and registering these information in relation to one another as described above. Furthermore, the receiving-side telephone apparatus need not have a function of memorizing the various kinds of unique information. Therefore, it is possible to remove the limitation in number of registrable unique information (in particular, in number of ring tone melodies based on the music data and in number of the image data) due to the physical limitation of the memory capacity of a memory in the receiving-side telephone apparatus. Thus, irrespective of the physical limitation of the memory capacity, the caller can be easily, efficiently, and properly identified and a desired unique expression can be produced.

Figure 2:
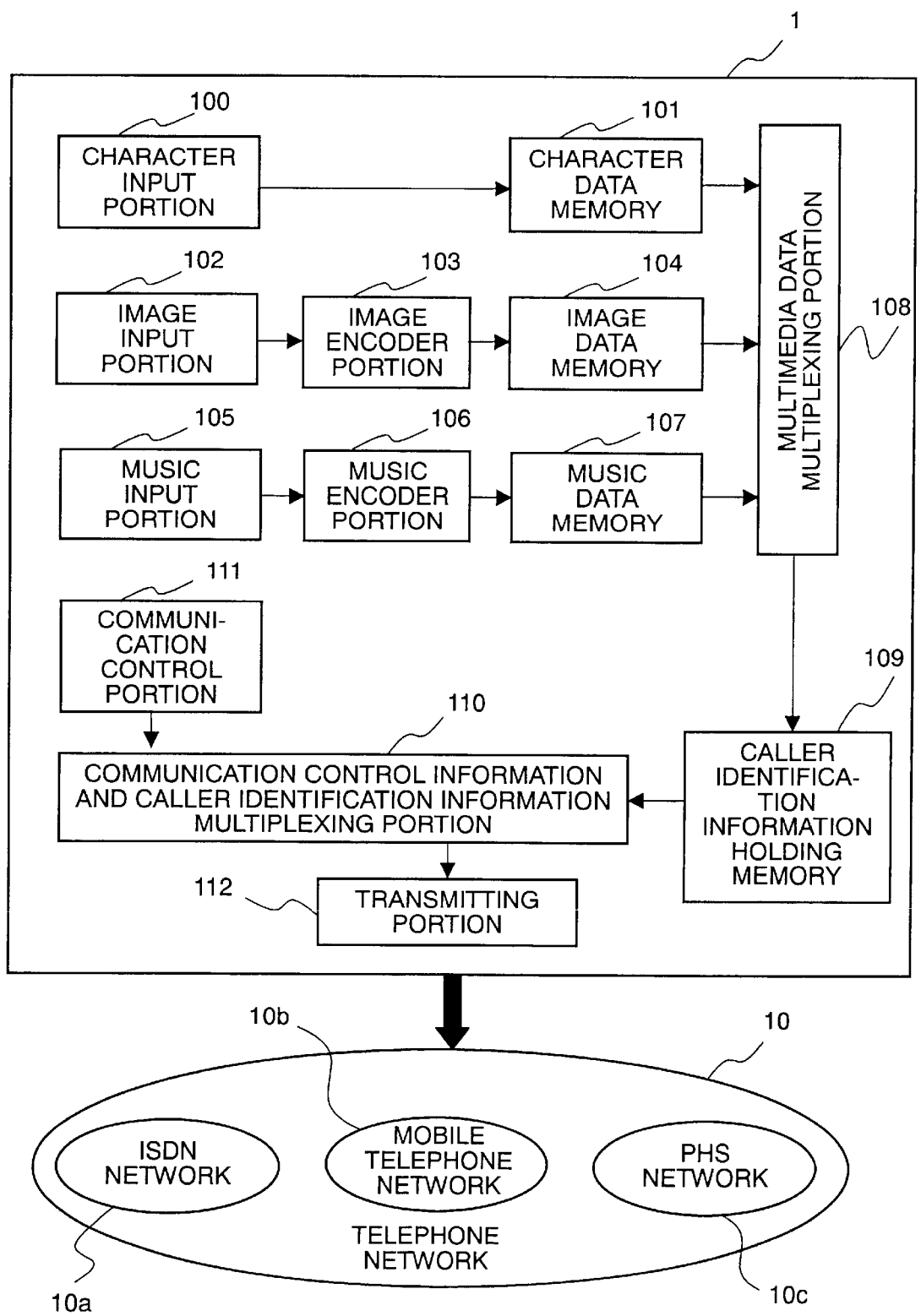
FIG. 2 is a block diagram showing a transmission-side telephone apparatus used in a telephone system with a caller identification function according to an embodiment of this invention.
Figure 3:
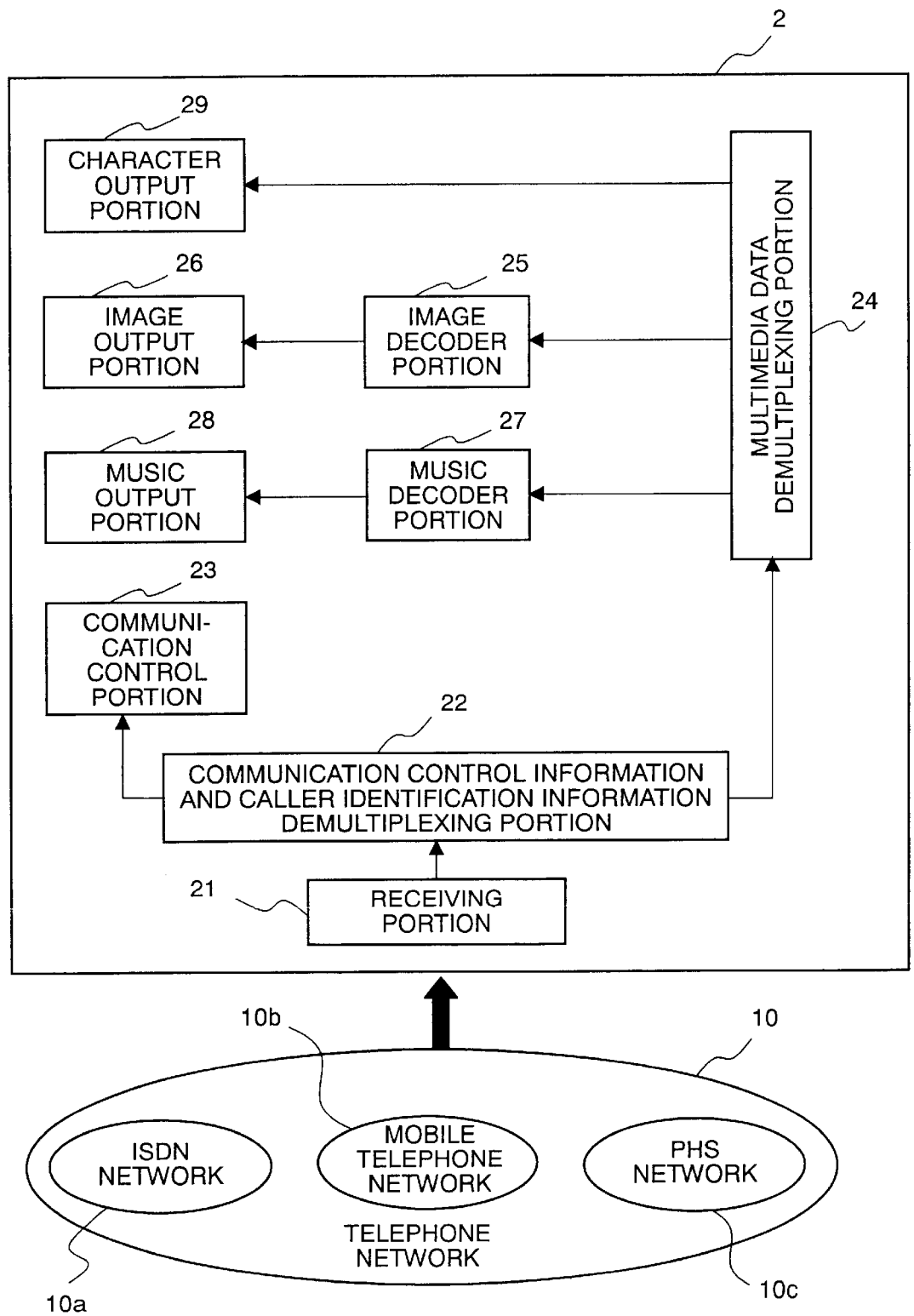
FIG. 3 is a block diagram showing a receiving-side telephone apparatus used in the telephone system illustrated in FIG. 2.

Referring to FIGS. 2 and 3, description will be made of the telephone system with a caller identification function using the above-mentioned caller identification method according to an embodiment of this invention.

The telephone system with a caller identification function is similar to the related telephone system of FIG. 1 in that communication is possible between a transmitting-side telephone apparatus 1 and a receiving-side telephone apparatus 2 through a telephone network 10 including an ISDN network 10a, a mobile telephone network 10b, and a PHS network 10c after a call receiving operation, and that the receiving-side telephone apparatus 2 can identify the transmitting-side telephone apparatus 1 as a caller. However, in this invention, each of the transmitting-side telephone apparatus 1 and the receiving-side telephone apparatus 2 is modified in basic structure by applying the above-mentioned caller identification method.

Referring to FIG. 2, the transmitting-side telephone apparatus 1 comprises a character input portion 100 for entering character data, an image input portion 102 for entering image data, a music input portion 105 for entering music data, a character data memory 101 for memorizing the character data entered by the character input portion 100, an image encoder portion 103 for encoding the image data entered by the image input portion 102 to produce encoded image data, an image data memory 104 for memorizing the encoded image data encoded by the image encoder portion 103, a music encoder portion 106 for encoding the music data entered by the music input portion 105 to produce encoded music data, a music data memory 107 for memorizing the encoded music data encoded by the music encoder portion 106, a multimedia data multiplexing portion 108 for reading the character data memorized in the character data memory 101, the encoded image data memorized in the image data memory 104, and the encoded music data memorized in the music data memory 107, combining and multiplexing these data, and producing multiplexed multimedia data, a caller identification information holding memory 109 for memorizing and holding, as caller identification information, the multiplexed multimedia data multiplexed by the multimedia data multiplexing portion 108, a transmission communication control portion 111 for producing communication control information, a communication control information/caller identification information multiplexing portion 110 for multiplexing the communication control information from the transmission communication control portion 111 and the caller identification information from the caller identification information holding memory 109 to produce multiplexed transmission data, and a transmitting portion 112 for transmitting the multiplexed transmission data multiplexed by the communication control information/caller identification information multiplexing portion 110.

A combination of the multimedia data multiplexing portion 108 and the caller identification information holding memory 109 serves as data multiplexing and memorizing means for memorizing, as the caller identification information, the multiplexed multimedia data obtained by combining and multiplexing the character data, the encoded image data, and the encoded music data. A combination of the data multiplexing and memorizing means and the character input portion 100, the image input portion 102, the music input portion 105, the character data memory 101, the image encoder portion 103, the image data memory 104, the music encoder portion 106, and the music data memory 107 serves as caller identification information setting and holding means for setting and holding as the caller identification information unique information specific to the transmitting-side telephone apparatus itself. A combination of the transmission communication control portion 111, the communication control information/caller identification information multiplexing portion 110, and the transmitting portion 112 serves as communication information transmitting means for reading, upon origination of a call, the caller identification information from the caller identification information holding memory 109 of the caller identification information setting and holding means and transmitting the caller identification information following the communication control information for connection of communication through the telephone network 10 to the receiving-side telephone apparatus 2. The communication information transmitting means is adapted to transmit the multiplexed transmission data obtained by multiplexing the communication control information and the caller identification information.

Referring to FIG. 3, the receiving-side telephone apparatus 2 comprises a receiving portion 21 for receiving the multiplexed transmission data, a communication control information/caller identification information demultiplexing portion 22 for demultiplexing the multiplexed transmission data received by the receiving portion 21 into the communication control information and the caller identification information, a reception communication control portion 23 for receiving the communication control information demultiplexed by the communication control information/caller identification information demultiplexing portion 22, a multimedia data demultiplexing portion 24 supplied with the caller identification information from the communication control information/caller identification information demultiplexing portion 22 for demultiplexing the caller identification information comprising the multiplexed multimedia data to produce the character data, the encoded image data, and the encoded music data, a character output portion 29 for producing a character expression based on the character data demultiplexed by the multimedia data demultiplexing portion 24, an image decoder portion 25 for decoding the encoded image data demultiplexed by the multimedia data demultiplexing portion 24 to reproduce the image data, an image output portion 26 for producing an image expression based on the image data decoded by the image decoder portion 25, a music decoder portion 27 for decoding the encoded music data demultiplexed by the multimedia data demultiplexing portion 24 to reproduce the music data, and a music output portion 28 for producing a sound expression based on the music data decoded by the music decoder portion 27.

A combination of the receiving portion 21, the communication control information/caller identification information demultiplexing portion 22, and the reception communication control portion 23 serves as communication information receiving means for receiving and demultiplexing the communication control information and the caller identification information. A combination of the multimedia data demultiplexing portion 24, the character output portion 29, the image decoder portion 25, the image output portion 26, the music decoder portion 27, and the music output portion 28 serves as data expressing means supplied with the caller identification information demultiplexed by the communication control information/caller identification information demultiplexing portion 22 of the communication information receiving means for demultiplexing the caller identification information comprising the multiplexed multimedia data into the character data, the image data, and the music data to produce the character expression, the image expression, and the sound expression based on the character data, the image data, and the music data. Furthermore, a combination of the communication information receiving means and the data expressing means serves as information detecting and expressing means for identifying, upon reception of the communication control information and the caller identification information, the transmitting-side telephone apparatus as the caller with reference to the caller identification information to produce unique expression representative of the caller.

Now, a basic operation of the telephone system with a caller identification function will be described in detail. In the telephone system, the user of the transmitting-side telephone apparatus 1 as the caller is required to prepare various kinds of unique information indicative of the caller identification information in the transmitting-side telephone apparatus 1.

The user enters through the character input portion 100 the character data indicative of text information such as a user's name. The character data are stored in the character data memory 101. The image input portion 102 is implemented by, for example, a CMOS camera or a CCD camera. The image data such as a still image or a moving image picked up by the image input portion 102 are encoded and compressed by the image encoder portion 103 into the encoded image data to be stored in the image data memory 104. Furthermore, the music data acquired by the music input portion 105 such as a microphone are encoded and compressed by the music encoder portion 106 into the encoded music data, if necessary. The music data or the encoded music data are stored in the music data memory 107. The image data to be stored in the image data memory 104 or the music data to be stored in the music data memory 107 may be acquired from a removable memory card or an internet source.

The user selects a desired combination of the character data, the encoded image data, and the music data or the encoded music data stored in the character data memory 101, the image data memory 104, and the music data memory 107, respectively. The multimedia data multiplexing portion 108 multiplexes those data selected by the user into the multiplexed multimedia data and supplies the multiplexed multimedia data to the caller identification information holding memory 109. The caller identification information holding memory 109 holds the multiplexed multimedia data as the caller identification information enabling the receiving-side telephone apparatus 2 to identify the caller upon call reception.

When the user of the transmitting-side telephone apparatus 1 as the caller performs a call originating operation, the communication control information/caller identification information multiplexing portion 110 reads from the transmission communication control portion 111 a communication control signal having the communication control information for connection of telephone communication. In addition, the communication control information/caller identification information multiplexing portion 110 reads from the caller identification information holding memory 109 the caller identification information comprising the multiplexed multimedia data. The communication control information/caller identification information multiplexing portion 110 multiplexes the communication control information and the caller identification information to produce the multiplexed transmission data and delivers the multiplexed transmission data through the transmitting portion 112 to the telephone network 10.

The receiving-side telephone apparatus 2 receives the multiplexed transmission data transmitted through the telephone network 10. In the receiving-side telephone apparatus 2, the receiving portion 21 acquires through the telephone network 10 the multiplexed transmission data containing the communication control information and the caller identification information. The receiving portion 21 transfers the multiplexed transmission data to the communication control information/caller identification information demultiplexing portion 22. The communication control information/caller identification information demultiplexing portion 22 demultiplexes the multiplexed transmission date into the communication control information and the caller identification information and transmits the transmission control information and the caller identification information to the reception communication control porting 23 and the multimedia data demultiplexing portion 24, respectively. The reception communication control portion 23 receives the communication control information. The multimedia data demultiplexing portion 24 demultiplexes the caller identification information comprising the multiplexed multimedia data to produce the character data, the encoded image data, and the music data or the encoded music data. The character expression based on the character data is displayed by the character output portion 29. The encoded image data are decoded by the image decoder portion 25 into the image data and the image expression based on the image data is displayed by the image output portion 26. The encoded music data are decoded into the music data by the music decoder portion 27 and the sound expression based on the music data is generated by the music output portion 28. In other words, a so-called ring tone melody is played. Each of the character output portion 29 and the image output portion 26 has a display such as a liquid crystal display (LCD).

Thus, in the above-mentioned telephone system with a caller identification function, the transmitting-side telephone apparatus 2 transmits, upon origination of the call to the receiving-side telephone apparatus 1, the caller identification information comprising the multiplexed multimedia data obtained by multiplexing the character data, the encoded image data, and the music data or the encoded music data. The receiving-side telephone apparatus 2 receives and demultiplexes the caller identification information to produce the character data, the image data, and the music data. The receiving-side telephone apparatus 2 is adapted to display the character expression and the image expression based on the character data and the image data, respectively, and to generate the ring tone melody based on the music data. Thus, the user of the receiving-side telephone apparatus 2 visually confirms the name or the image of the caller displayed on the display or audibly confirms the ring tone melody. Thus, the user of the receiving-side telephone apparatus 2 can recognize the caller before responding the call and starting communication with the caller.

As described above, according to this invention, the receiving-side telephone apparatus receives the caller identification information comprising the multiplexed multimedia data upon call reception from the transmitting-side telephone apparatus and demultiplexes the caller identification information to produce the character data, the image data, and the music data. By displaying the character expression and the image expression based on the character data and the image data, respectively and by generating the ring tone melody based on the music data, the user of the receiving-side telephone apparatus visually and audibly recognizes the caller before responding to the call and starting communication with the caller. Therefore, it is unnecessary to preliminarily carry out the telephone directory registering operation of registering the caller identification information comprising various kinds of unique information related to one another. Furthermore, without degrading the optionality and the convenience and irrespective of physical limitation upon the memory capacity, the caller can be easily, efficiently, and properly identified and the unique expression representative of the caller can be produced. As a consequence, it is unnecessary for the receiving-side telephone apparatus to preliminarily obtain the caller identification information comprising the various kinds of unique information for each of a plurality of users of transmitting-side telephone apparatuses as expected callers. Furthermore, it is possible to save time and labor required for the telephone directory registering operation of registering various kinds of unique information in relation to each of a plurality of telephone numbers of the expected callers. In addition, in case where an unknown caller is calling for the first time, the unique information (caller identification information) of the caller can be obtained before responding the call. Thus, it is possible to respond to the call (to start communication) after the caller is recognized and the uneasiness for the unknown caller is reduced. Still further, it is unnecessary for the receiving-side telephone apparatus to memorize and hold the caller identification information as the unique information for identifying the caller. As a consequence, the memory capacity of the memory in the receiving-side telephone apparatus is considerably saved.

What is claimed is:

1. A caller identification method for use in a telephone system in which communication is possible between a transmitting-side telephone apparatus and a receiving-side telephone apparatus through a telephone network after a call origination operation and a call receiving operation are carried out in said transmitting-side telephone apparatus and said receiving-side telephone apparatus, respectively, said method enabling said receiving-side telephone apparatus to identify said transmitting-side telephone apparatus as a caller, said transmitting-side telephone apparatus having a memory which stores unique information as caller identification information, said transmitting-side telephone apparatus transmitting, upon origination of a call, the caller identification information following communication control information for connection of communication through said telephone network to said receiving-side telephone apparatus, said receiving-side telephone apparatus receiving the caller identification information upon reception of the call and identifying the caller on the basis of the caller identification information, wherein:

said transmitting-side telephone apparatus multiplexes a plurality of different kinds of unique information including at least character data, image data, and music data to produce multiplexed multimedia data;

said transmitting-side telephone apparatus storing said multiplexed multimedia data in said memory as the caller identification information;

said transmitting-side telephone apparatus transmitting, upon origination of the call, said multiplexed multimedia data as the caller identification information following said communication control information from said memory to said receiving-side telephone apparatus through said telephone network;

said receiving-side telephone apparatus receiving said multiplexed multimedia data as said caller identification information upon reception of the call;

said receiving-side telephone apparatus demultiplexing said multiplexed multimedia data into the character data, the image data, and the music data;

said receiving-side telephone apparatus identifying the caller on the basis of the character data, the image data, and the music data.

2. A telephone system in which communication is possible between a transmitting-side telephone apparatus and a receiving-side telephone apparatus through a telephone network after a call origination operation and a call receiving operation are carried out in said transmitting-side telephone apparatus and said receiving-side telephone apparatus, respectively, said system enabling said receiving-side telephone apparatus to identify said transmitting-side telephone apparatus as a caller, said transmitting-side telephone apparatus including a memory which stores unique information as caller identification information, said transmitting-side telephone apparatus transmitting, upon origination a call, the caller identification information following communication control information for connection of communication through said telephone network of said receiving-side telephone apparatus, said receiving-side telephone apparatus receiving the caller identification information upon reception of the call and identifying the caller on the basis of the caller identification information, wherein said transmitting-side telephone apparatus comprises:

a multiplexing portion for multiplexing a plurality of different kinds of unique information including at least character data, image data, and music data to produce multiplexed multimedia data, said multiplexing portion storing said multiplexed multimedia data in said memory as the caller identification information; and a transmitting portion for transmitting, upon origination of the call, said multiplexed multimedia data as aid caller identification information following said communication control information from said memory to said receiving-side telephone apparatus through said telephone network;

said receiving-side telephone apparatus comprising:

a receiving portion for receiving said multiplexed multimedia data as said caller identification information upon reception of the call; and a demultiplexing portion for demultiplexing said multiplexed multimedia data into the character data, the image data, and the music data;

said receiving-side telephone apparatus identifying the caller on the basis of the character data, the image data, and the music data.

3. A transmitting-side telephone apparatus comprising:

a memory which stores unique information as caller identification information;

a multiplexing portion for multiplexing a plurality of different kinds of unique information including at least character data, image data, and music data to produce multiplexed multimedia data, said multiplexing portion storing said multiplexed multimedia data in said memory as the caller identification information; and a transmitting portion for transmitting, upon origination of a call, said multiplexed multimedia data a said caller identification information from said memory to a receiving-side telephone apparatus through a telephone network.

4. A receiving-side telephone apparatus for use in combination with a transmitting side telephone apparatus comprising: a memory which stores unique information as caller identification information; a multiplexing portion for multiplexing a plurality of different kinds of unique information including at least character data, image data, and music data to produce multiplexed multimedia data, said multiplexing portion storing said multiplexed multimedia data in said memory as the caller identification information; and a transmitting portion for transmitting, upon origination of a call, said multiplexed multimedia data as said caller identification information from said memory to said receiving-side telephone apparatus through a telephone network; said receiving-side telephone apparatus comprising:

a receiving portion for receiving said multiplexed multimedia data as said caller identification information upon reception of the call; and a demultiplexing portion for demultiplexing said multiplexed multimedia data into the character data, the image data, and the music data;

said receiving-side telephone apparatus identifying the caller on the basis of the character data, the image data, and the music data.

5. A telephone system with a call identifying function in which communication is possible between a transmitting-side telephone apparatus and a receiving-side telephone apparatus through a telephone network after a call origination operation and a call receiving operation are carried out in said transmitting-side telephone apparatus and said receiving-side telephone apparatus, respectively, said receiving-side telephone apparatus being adapted to identify said transmitting-side telephone apparatus as a caller, said transmitting-side telephone apparatus comprising caller identification information setting and holding means for setting and holding as caller identification information unique information specific to said transmitting-side telephone apparatus itself, and communication information transmitting means for reading, upon origination of a call, the caller identification information from said caller identification information setting and holding means and transmitting the caller identification information following communication control information for connection of communication through said telephone network to said receiving-side telephone apparatus, said receiving-side telephone apparatus comprising information detecting and expressing means for identifying, upon reception of the communication control information and the caller identification information, the caller with reference to the caller identification information to produce unique expression representative of the caller, wherein said caller identification information setting and holding means comprises data multiplexing and memorizing means for memorizing, as the caller identification information, multiplexed multimedia data obtained by multiplexing a plurality of different kinds of unique information including at least character data, image data, and music data, said communication information transmitting means being adapted to multiplex and transmit the communication control information and the caller identification information, said information detecting and expressing means comprising communication information receiving means for receiving and demultiplexing the transmission control information and the caller identification information, and data expressing means supplied with the caller identification information from said communication information receiving means for demultiplexing the caller identification information into the character data, the image data, and the music data to produce the unique expression.

6. A telephone system as claimed in claim 5, wherein said caller identification information setting and holding means comprises a character input portion for entering the character data, an image input portion for entering the image data, a music input portion for entering the music data, a character data memory for memorizing the character data entered by said character input portion, an image data memory for memorizing the image data entered by said image input portion, and a music data memory for memorizing the music data entered by said music input portion, said data multiplexing and memorizing means comprising a multimedia data multiplexing portion for reading and multiplexing the character data memorized in said character data memory, the image data memorized in said image data memory, and the music data memorized in said music data memory to produce the multiplexed multimedia data, and a caller identification information holding memory for memorizing and holding the caller identification information comprising the multiplexed multimedia data obtained by said multimedia data multiplexing portion, said communication information transmitting means comprising a transmission communication control portion for producing the communication control information, a communication control information/ caller identification information multiplexing portion for multiplexing the communication control information from said transmission communication control portion and the caller identification information read from said call identification information memory to produce multiplexed transmission data, and a transmitting portion for transmitting the multiplexed transmission data obtained by said communication control information/caller identification information multiplexing portion.

7. A telephone system as claimed in claim 6, wherein said communication information receiving means comprises a receiving portion for receiving the multiplexed transmission data, a communication control information/caller identification information demultiplexing portion for demultiplexing the multiplexed transmission data received by said receiving portion into the communication control information and the caller identification information, and a reception communication control portion for receiving the communication control information demultiplexed by said communication control information/caller identification information demultiplexing portion, said data expressing means comprising a multimedia data demultiplexing portion supplied with the caller identification information from said communication control information/caller identification information demultiplexing portion for demultiplexing the caller identification information comprising the multiplexed multimedia data to produce the character data, the image data, and the music data, a character output portion for producing a character expression based on the character data demultiplexed by said multimedia data demultiplexing portion, an image output portion for producing an image expression based on the image data demultiplexed by said multimedia data demultiplexing portion, and a music output portion for producing a sound expression based on the music data demultiplexed by said multimedia data demultiplexing portion.

8. A telephone system as claimed in claim 1, further comprising:

multiplexing, by said transmitting-side telephone apparatus, the unique information with the multiple and multimedia data, to obtain the caller identification information; and outputting, by said transmitting-side telephone apparatus, the caller identification information containing the unique information of said transmitting-side telephone apparatus multiplexed with the multiplexed multimedia data, to said telephone network;

receiving, by said receiving-side telephone apparatus from said telephone network, the caller identification information containing the unique information multiplexed with the multiplexed multimedia data; and demultiplexing, by said receiving-side telephone apparatus, the caller identification information into: a) said multiplexed multimedia data, and b) the unique information of said transmitting-side telephone apparatus, wherein said receiving-side telephone apparatus further demultiplexes said multiplexed multimedia data into the character data, the image data, and the music data.

9. A telephone system as claimed in claim 2, wherein said multiplexing portion further multiplexes the unique information of said transmitting-side telephone apparatus with said multiplexed multimedia data, as the caller identification information, and wherein said demultiplexing portion further demultiplexes the caller identification information from said multiplexed multimedia data, before demultiplexing said multiplexed multimedia data into the character data, the image data, and the music data.

10. A transmitting-side telephone apparatus as claimed in claim 3, wherein:

said multiplexing portion multiplexes the unique information with said multiplexed multimedia data, as the caller identification information, and said transmitting portion transmits the unique information multiplexed with said multiplexed multimedia data, as the caller identification information, through the telephone network.

11. A receiving-side telephone apparatus as claimed in claim 4, wherein:

said multiplexing portion of said transmitting-side telephone apparatus multiplexes the unique information with said multiplexed multimedia data, as the caller identification information, and said transmitting portion of said transmitting-side telephone apparatus transmits the caller identification information containing the unique information multiplexed with said multiplexed multimedia data, through the telephone network, and wherein:

said demultiplexing portion of said receiving-side telephone apparatus further demultiplexes the unique information from said multiplexed multimedia data, before demultiplexing said multiplexed multimedia data into the character data, the image data, and the music data.

* * * * *